(12) United States Patent
Komiya et al.

(10) Patent No.: US 10,436,280 B2
(45) Date of Patent: Oct. 8, 2019

(54) FLUID-FILLED VIBRATION DAMPING DEVICE

(71) Applicant: SUMITOMO RIKO COMPANY LIMITED, Komaki-shi, Aichi (JP)

(72) Inventors: Yasuhiro Komiya, Komaki (JP); Takashi Hayashi, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 49 days.

(21) Appl. No.: 15/720,391

(22) Filed: Sep. 29, 2017

(65) Prior Publication Data

US 2018/0023655 A1    Jan. 25, 2018

Related U.S. Application Data

(63) Continuation of application No. PCT/JP2016/066580, filed on Jun. 3, 2016.

(30) Foreign Application Priority Data

Aug. 24, 2015   (JP) ................................. 2015-165294

(51) Int. Cl.
*F16F 13/10* (2006.01)
*B29C 45/14* (2006.01)

(52) U.S. Cl.
CPC ............... *F16F 13/10* (2013.01); *B29C 45/14* (2013.01)

(58) Field of Classification Search
CPC ......... F16F 13/10; F16F 13/103; B29C 45/14; B60K 5/1208

(Continued)

(56) References Cited

U.S. PATENT DOCUMENTS

| 5,704,598 | A | * | 1/1998 | Kojima | F16F 13/10 267/140.13 |
| 6,267,362 | B1 | * | 7/2001 | Satori | F16F 13/103 267/140.13 |

(Continued)

FOREIGN PATENT DOCUMENTS

| EP | 187188 A2 * | 7/1986 | ............ F16F 13/108 |
| JP | H09-177866 A | 7/1997 | |

(Continued)

OTHER PUBLICATIONS

Aug. 2, 2016 International Search Report issued in International Patent Application No. PCT/JP2016/066580.

(Continued)

*Primary Examiner* — Bradley T King
*Assistant Examiner* — Stephen M Bowes
(74) *Attorney, Agent, or Firm* — Oliff PLC

(57) ABSTRACT

A fluid-filled vibration damping device including: an inner mounting member; an outer bracket formed by molding; a main rubber elastic body elastically connecting the inner mounting member and the outer bracket with each other; a fluid chamber for which a portion of a wall is constituted by the main rubber elastic body with a non-compressible fluid sealed therein; a caulking member whose material is different from a material of the outer bracket, the caulking member being fixed to the outer bracket in a projecting state; and a lid member constituting an other portion of the wall of the fluid chamber, the lid member being attached to the outer bracket by being fastened through caulking using the caulking member.

6 Claims, 8 Drawing Sheets

(58) Field of Classification Search
USPC .................................................. 267/140.13
See application file for complete search history.

(56) References Cited

U.S. PATENT DOCUMENTS

| | | | | |
|---|---|---|---|---|
| 6,523,815 B2* | 2/2003 | Yamamoto | ............ | F16F 13/105 |
| | | | | 267/140.13 |
| 7,188,829 B2 | 3/2007 | Miyahara | | |
| 8,011,644 B2* | 9/2011 | Saito | ................. | F16F 13/105 |
| | | | | 267/140.13 |
| 8,740,197 B2* | 6/2014 | Ohashi | ................. | F16F 13/108 |
| | | | | 267/140.13 |
| 9,435,396 B2* | 9/2016 | Matsumoto | ............ | F16F 13/10 |
| 2004/0201151 A1* | 10/2004 | Miyahara | ................ | F16F 13/10 |
| | | | | 267/140.11 |
| 2014/0175719 A1 | 6/2014 | Kanaya | | |
| 2014/0232049 A1 | 8/2014 | Kanaya | | |
| 2014/0327199 A1 | 11/2014 | Kanaya | | |
| 2016/0153514 A1* | 6/2016 | Kubota | ................ | F16F 13/103 |
| | | | | 267/122 |

FOREIGN PATENT DOCUMENTS

| | | |
|---|---|---|
| JP | 2004-316723 A | 11/2004 |
| JP | 4199379 B2 | 12/2008 |
| JP | 2014-31850 A | 2/2014 |

OTHER PUBLICATIONS

Jul. 27, 2018 Office Action issued in Chinese Patent Application No. 201680010154.6.
Mar. 8, 2018 International Preliminary Report on Patentability issued in International Patent Application No. PCT/JP2016/066580.
Mar. 5, 2019 Office Action issued in Chinese Patent Application No. 201680010154.6.
Mar. 15, 2019 Office Action issued in Japanese Patent Application No. 2015-165294.

* cited by examiner

FLUID-FILLED VIBRATION DAMPING DEVICE

INCORPORATED BY REFERENCE

The disclosure of Japanese Patent Application No. 2015-165294 filed on Aug. 24, 2015 including the specification, drawings and abstract is incorporated herein by reference in its entirety. This is a Continuation of International Application No. PCT/JP2016/066580 filed on Jun. 3, 2016.

BACKGROUND OF THE INVENTION

1. Field of the Invention

The present invention pertains to a fluid-filled vibration damping device that uses the vibration-damping effect based on flow behavior of a non-compressible fluid sealed therein, etc.

2. Description of the Related Art

From the past, there has been known a fluid-filled vibration damping device that exhibits the vibration-damping effect based on flow behavior of a fluid sealed therein etc., as a kind of vibration damping device that is interposed between members constituting the vibration transmission system to connect the members to each other in a vibration-damping manner. The fluid-filled vibration damping device is applied to an automotive engine mount or the like. As Japanese Patent No. JP-B-4199379 and the like disclose, the fluid-filled vibration damping device comprises an inner mounting member that should be mounted on one of the components of the vibration transmission system, an outer mounting member that should be mounted on the other of the components of the vibration transmission system, a main rubber elastic body that elastically connects the inner mounting member and the outer mounting member, and a fluid chamber whose wall is partially constituted by the main rubber elastic body with a non-compressible fluid sealed therein. The inner mounting member is mounted on one of the components of the vibration transmission system via an inner bracket, while the outer mounting member is mounted on the other of the components of the vibration transmission system via an outer bracket.

In the fluid-filled vibration damping device of JP-B-4199379, a flexible film constituting a portion of the wall of the fluid chamber is fastened by caulking to the outer mounting member, thus forming the fluid chamber in a fluid-tight manner.

In order to simplify and lighten the structure, U.S. Pat. No. 7,188,829 and other documents have proposed a structure wherein the outer mounting member is omitted, and the main rubber elastic body is bonded by vulcanization directly on the outer bracket, while in JP-B-4199379, the main rubber elastic body is mounted to the outer bracket via the outer mounting member.

However, in the structure wherein the outer mounting member is omitted like U.S. Pat. No. 7,188,829, it is not possible to fasten a lid member for defining the fluid chamber such as the flexible film, by caulking to the outer mounting member like JP-B-4199379, so that a structure for fastening the lid member by caulking is necessary. Especially, where the outer bracket is formed of synthetic resin etc. like U.S. Pat. No. 7,188,829, it is difficult to even realize the caulking structure like that of JP-B-4199379, using the outer bracket. In addition, because the outer bracket is generally a thick and large member formed by molding in order to obtain high rigidity, it is also difficult to form a thin caulking piece as a part of such outer bracket.

U.S. Pat. No. 7,188,829 discloses a structure wherein a caulking member for attaching the flexible film etc. is bonded by vulcanization to the main rubber elastic body. Unfortunately, for this structure, deformation of the main rubber elastic body allows displacement of the caulking member relative to the outer bracket, so that it is difficult to position the caulking member to the outer bracket with sufficient accuracy.

SUMMARY OF THE INVENTION

The present invention has been developed in view of the above-described matters as the background, and it is an object of the present invention to provide a fluid-filled vibration damping device with a novel structure capable of structural simplification owing to reduction in the number of the parts, securement of the fluidtightness of the fluid chamber, and obtainment of excellent vibration-damping performance.

The above and/or optional objects of this invention may be attained according to at least one of the following modes of the invention. The following modes and/or elements employed in each mode of the invention may be adopted at any possible optional combinations.

Specifically, a first mode of the present invention provides a fluid-filled vibration damping device comprising: an inner mounting member; an outer bracket formed by molding; a main rubber elastic body elastically connecting the inner mounting member and the outer bracket with each other; a fluid chamber for which a portion of a wall is constituted by the main rubber elastic body with a non-compressible fluid sealed therein; a caulking member whose material is different from a material of the outer bracket, the caulking member being fixed to the outer bracket in a projecting state; and a lid member constituting an other portion of the wall of the fluid chamber, the lid member being attached to the outer bracket by being fastened through caulking using the caulking member.

According to this fluid-filled vibration damping device constructed following the first mode, the outer bracket is fixed directly on the main rubber elastic body, so that the number of the parts is reduced and the structure is simplified accordingly, compared with the structure wherein the outer bracket is mounted to the main rubber elastic body via the outer mounting member fixed to the main rubber elastic body.

Since the caulking member of different material from that of the outer bracket is fixed on the outer bracket in a projecting state, it is also possible to fasten the lid member by caulking using the caulking member so as to define the fluid chamber in a fluid-tight manner while forming the outer bracket using a material that is not suitable for caulk fastening, e.g., synthetic resin or aluminum alloy. Additionally, it is possible to precisely position the caulking member to the outer bracket by fixing the caulking member to the rigid outer bracket, so that it is possible to stably mount the lid member, which is fastened by caulking using the caulking member, at an appropriate position relative to the outer bracket.

Moreover, it is possible to form the outer bracket with large size and high rigidity by molding. It is also possible to easily obtain the outer bracket including the target caulking member, by forming a thin caulking member, which is difficult to form by molding, separately from the outer bracket and fixing the caulking member to the outer bracket.

A second mode of the present invention provides the fluid-filled vibration damping device according to the first mode, wherein the outer bracket is made of synthetic resin.

According to the second mode, it is possible to form the outer bracket with lightness and a great degree of freedom in shape.

A third mode of the present invention provides the fluid-filled vibration damping device according to the first or second mode, wherein the caulking member is fixed to the outer bracket as being partially buried in the outer bracket.

According to the third mode, the caulking member can be firmly fixed to the outer bracket, thereby avoiding dislodgement, misposition, and the like of the caulking member relative to the outer bracket.

A fourth mode of the present invention provides the fluid-filled vibration damping device according to the first or second mode, wherein the caulking member is fixed to the outer bracket by being engaged in the outer bracket.

According to the fourth mode, the caulking member can be readily attached to the outer bracket. Moreover, if the caulking member is configured to be engaged in the outer bracket in the manufacture of the fluid-filled vibration damping device, for example in the step of fastening the lid member by caulking using the caulking member, the caulking member can be attached to the outer bracket through a small number of manufacturing steps.

A fifth mode of the present invention provides the fluid-filled vibration damping device according to any one of the first to fourth modes, wherein the lid member includes a flexible film, while a partition member is disposed in the fluid chamber to partition the fluid chamber into a pressure-receiving chamber whose wall is partially constituted by the main rubber elastic body and an equilibrium chamber whose wall is partially constituted by the flexible film on opposite sides of the partition member, and an orifice passage is formed communicating the pressure-receiving chamber and the equilibrium chamber with each other.

According to the fifth mode, it is possible to realize the fluid-filled vibration damping device that exerts excellent vibration-damping performance owing to the fluid flow through the orifice passage induced by the relative pressure fluctuation between the pressure-receiving chamber and the equilibrium chamber, by using the simple structure wherein the outer mounting member is omitted.

According to the present invention, the outer mounting member is omitted and the outer bracket is fixed to the main rubber elastic body, thus reducing the number of the parts and simplifying the structure accordingly. Also, the caulking member for caulk fastening of the lid member is formed of different material from that of the outer bracket and fixed to the outer bracket, whereby it is possible to highly realize each of the performance required for the outer bracket and the performance required for the caulking member. Furthermore, the independent caulking member is fixed to the outer bracket formed by molding, for which a thin part suitable for caulk working is difficult to form, whereby the target caulking structure can be provided for the outer bracket, while the caulking member can be positioned precisely to the outer bracket.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

Figure 1:
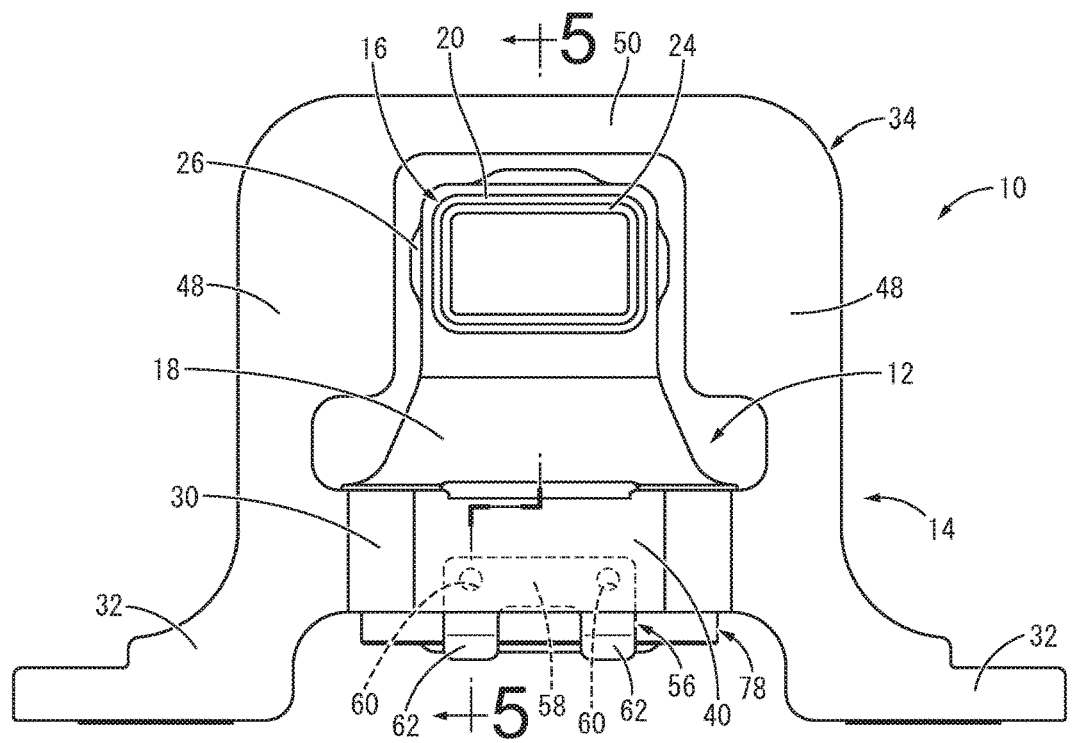
FIG. 1 is a front view of a fluid-filled vibration damping device in the form of an engine mount as a first embodiment of the present invention.
Figure 2:
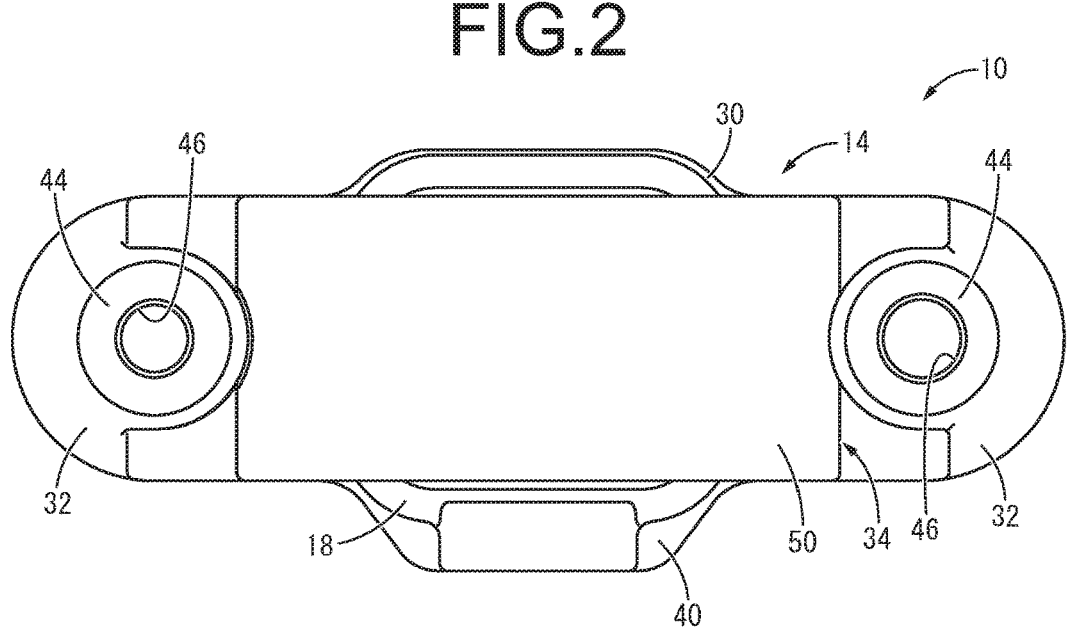
FIG. 2 is a top plan view of the engine mount shown in FIG. 1.
Figure 3:
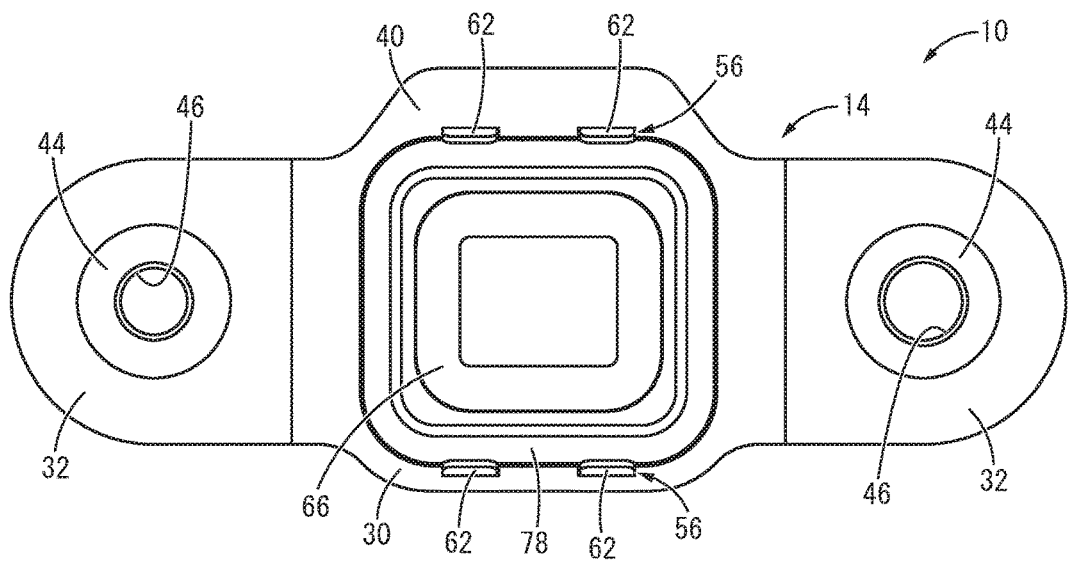
FIG. 3 is a bottom view of the engine mount shown in FIG. 1.
Figure 4:
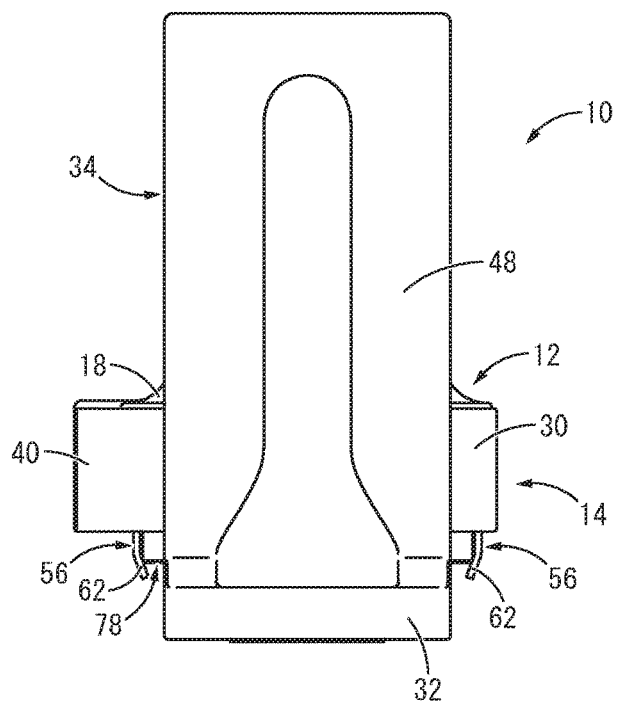
FIG. 4 is a right side view of the engine mount shown in FIG. 1.
Figure 5:
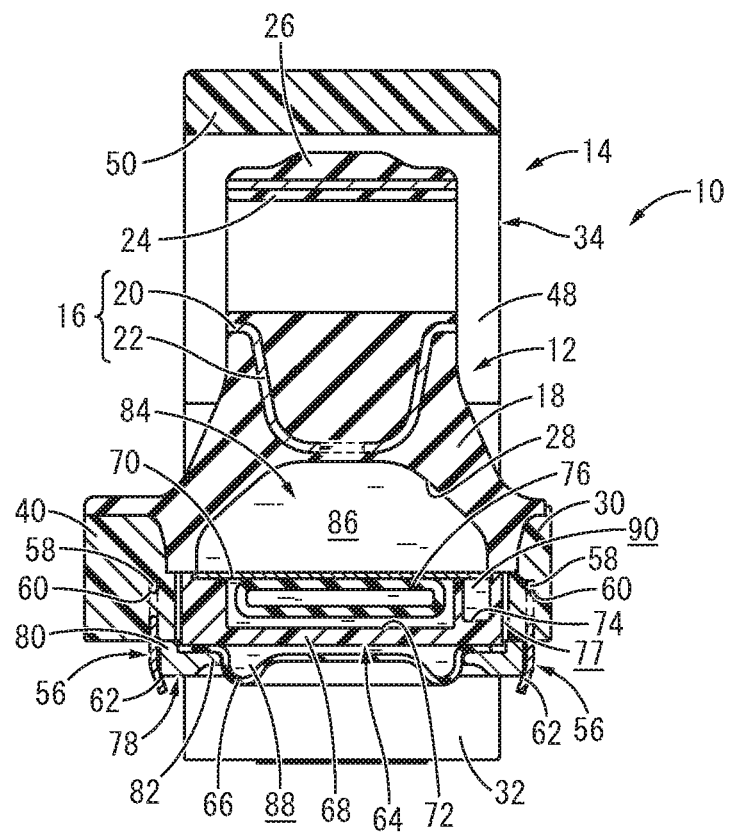
FIG. 5 is a cross sectional view taken along line 5-5 of FIG. 1.
Figure 6:
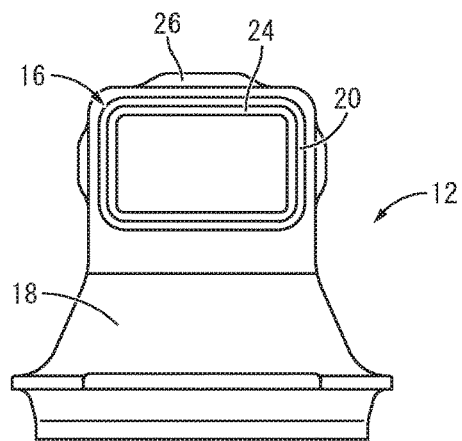
FIG. 6 is a front view of an integrally vulcanization molded component constituting the engine mount shown in FIG. 1.
Figure 7:
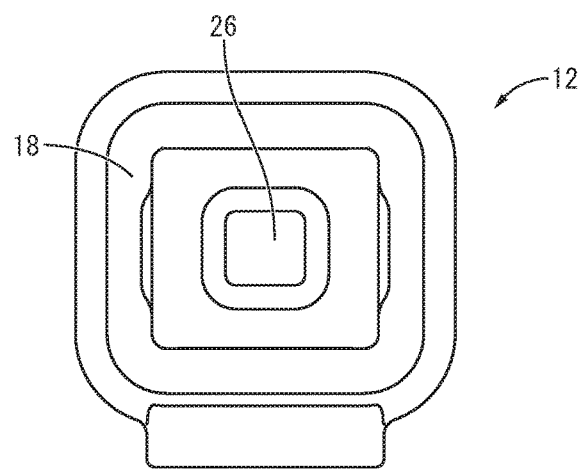
FIG. 7 is a top plan view of the integrally vulcanization molded component shown in FIG. 6.
Figure 8:
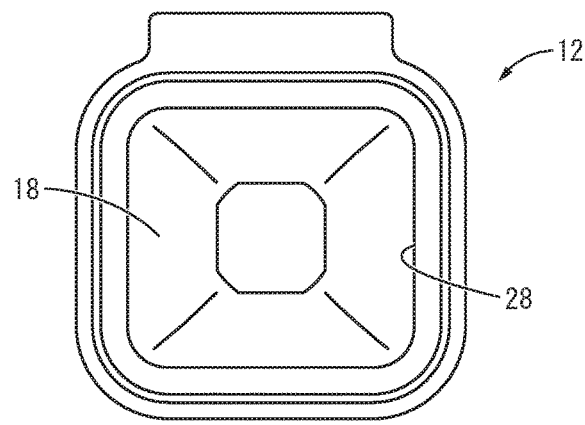
FIG. 8 is a bottom view of the integrally vulcanization molded component shown in FIG. 6.
Figure 9:
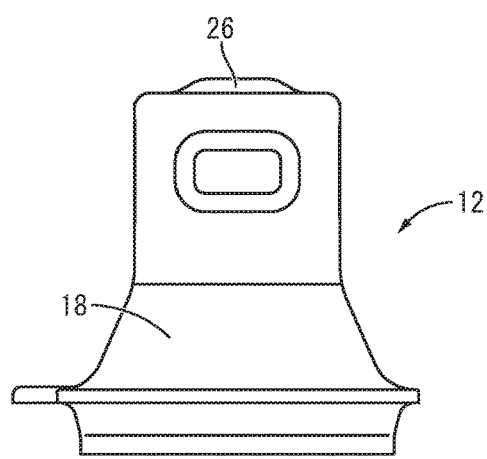
FIG. 9 is a right side view of the integrally vulcanization molded component shown in FIG. 6.

The embodiment of the present invention will be described hereinafter in reference to the drawings.

FIGS. 1 to 5 show an automotive engine mount 10 as a first embodiment of a fluid-filled vibration damping device structured according to the present invention. The engine mount 10 has a structure wherein an outer bracket 14 is fixed to an integrally vulcanization molded component 12. In description hereinafter, as a general rule, the up-down direction means the up-down direction in FIG. 1, the front-back direction means the left-right direction in FIG. 1, and the left-right direction means the up-down direction in FIG. 2.

More specifically, as FIGS. 6 to 9 show, the integrally vulcanization molded component 12 has a structure wherein a main rubber elastic body 18 is bonded by vulcanization to an inner mounting member 16. The inner mounting member 16 is a member of high rigidity formed of iron, aluminum alloy, or the like, having a fitting part 20 of about round-cornered rectangular tube shape extending in the left-right direction, and a bonded part 22 of concave shape opening upward. The bonded part 22 is integrally formed at the central portion of the lower wall of the fitting part 20 while protruding downward. The inner mounting member 16 of the present invention is formed of press material.

The main rubber elastic body 18 has a shape of a generally truncated quadrangular pyramid with a large diameter wherein the inner mounting member 16 is bonded by vulcanization to its small-diameter side end. In this embodiment, the bonded part 22 is bonded by vulcanization to the main rubber elastic body 18 as embedded therein, while the inner peripheral face of the fitting part 20 is covered by a covering rubber layer 24 formed integrally with the main rubber elastic body 18 and the outer peripheral face of the fitting part 20 is covered by a stopper rubber 26 formed integrally with the main rubber elastic body 18. The thickness dimension of the stopper rubber 26 of this embodiment is made larger partially, i.e., at about the centers for the upper side portion and the both front and back side portions.

In the main rubber elastic body 18, a large-diameter recess 28 is formed opening to the large-diameter side end face thereof. The large-diameter recess 28 is a concavity of substantially truncated quadrangular pyramid shape that becomes smaller as it goes to the upper side, with the depth that does not reach the bonded part 22 of the inner mounting member 16. Since this large-diameter recess 28 is formed in the lower part of the main rubber elastic body 18, both the inner peripheral face and the outer peripheral face of the lower part of the main rubber elastic body 18 are tilted toward the outer periphery as they go to the lower side.

Figure 10:
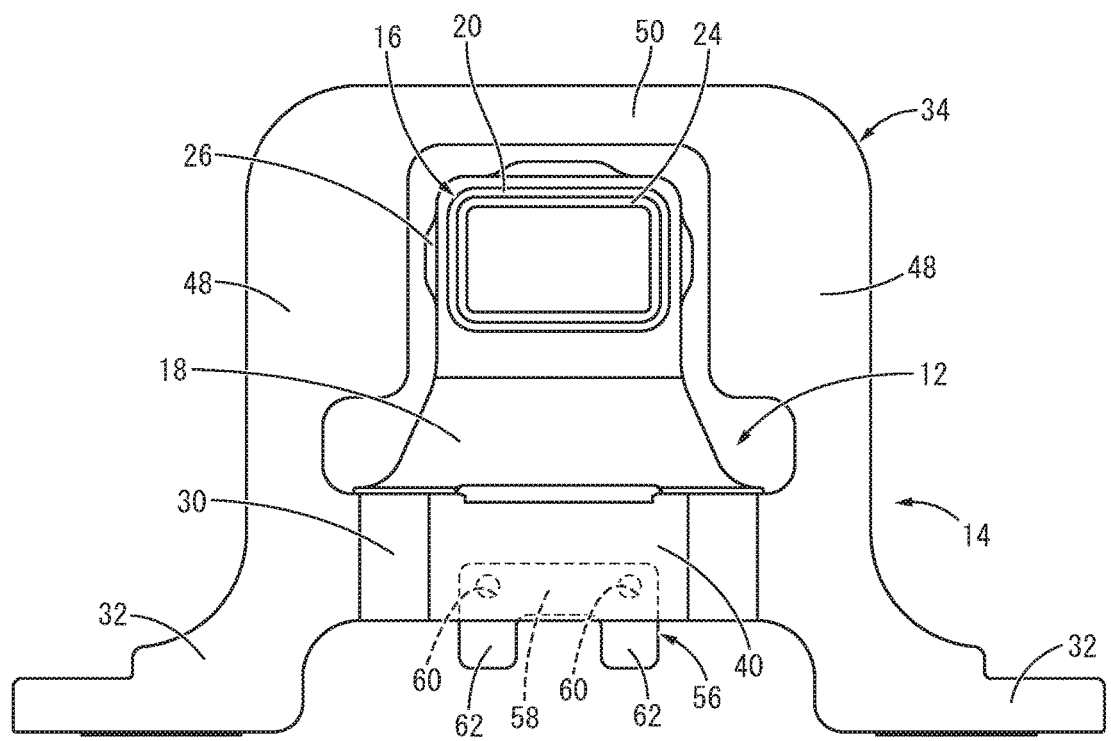
FIG. 10 is a front view wherein an outer bracket is fixed to the integrally vulcanization molded component shown in FIG. 6.
Figure 11:
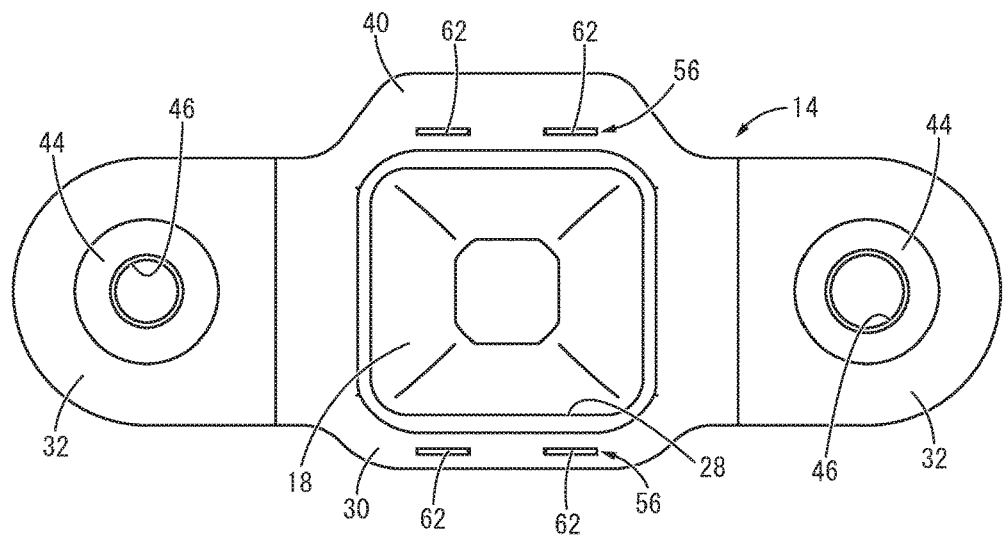
FIG. 11 is a bottom view wherein the outer bracket is fixed to the integrally vulcanization molded component shown in FIG. 6.
Figure 12:
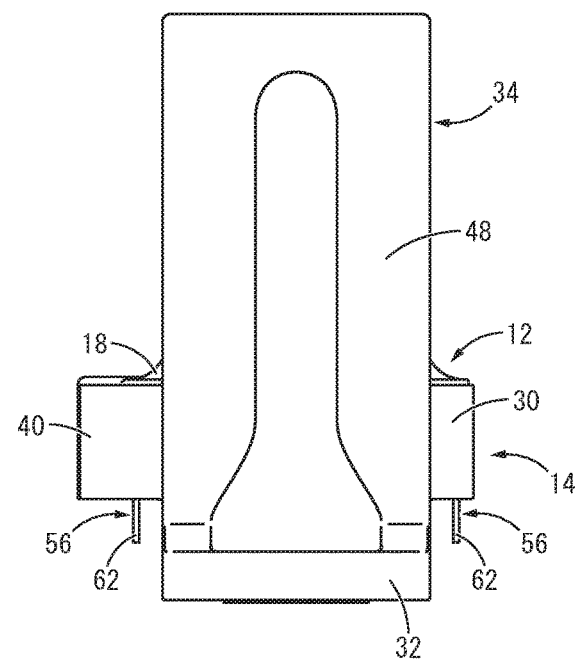
FIG. 12 is a right side view wherein the outer bracket is fixed to the integrally vulcanization molded component shown in FIG. 6.

As FIGS. 10 to 12 show, the outer bracket 14 is fixed to the integrally vulcanization molded component 12 of this structure. The outer bracket 14 is made of light metal etc. such as fiber-reinforced synthetic resin and aluminum alloy. The outer bracket 14 is integrally provided with an attachment tubular part 30 of nearly rectangular tubular shape with round corners, front and back attachment legs 32, 32 protruding downward at the front-back opposite sides of the attachment tubular part 30, and a gate-shaped stopper part 34 extending out to the upper side from the front and back attachment legs 32, 32 while straddling the upper space of the attachment tubular part 30.

The shape of the attachment tubular part 30 is a generally rectangular tube with the corners rounded. The inner peripheral face of the attachment tubular part 30 is a stepped tubular face with a larger inner dimension in its upper part than in its lower part. Additionally, the upper part of the inner peripheral face of the attachment tubular part 30 has a tapered shape expanding to the upper side. A stopper receiving part 40 is provided at one of the left-right opposite sides of the attachment tubular part 30 so as to project to the outer peripheral side, whereby the attachment tubular part 30 has a thicker wall at a portion on the periphery, namely at the stopper receiving part 40.

The attachment legs 32 project to the front-back outsides and extend out to the lower side, and, at its lower ends, they extend out to the front-back outsides. Nuts 44 are disposed at the lower ends of the attachment legs 32 such that parts of the nuts 44 are buried therein by insert molding, while screw threads are formed in the inner peripheral faces of the nuts 44, thereby providing screw holes 46 passing through in the up-down direction. The front and back attachment legs 32, 32 have a substantially front-back symmetrical structure to each other.

The gate-shaped stopper part 34 integrally includes front and back vertical walls 48, 48 extending out upward from the attachment tubular part 30, and a top wall 50 provided connecting the upper ends of the vertical walls 48, 48 to each other, and has a roughly gate shape as a whole. In the present embodiment, the upper parts of the front and back vertical walls 48, 48 project to the front-back insides further than the lower parts thereof, so that the upper parts have thicker walls in the front-back direction.

Figure 13:
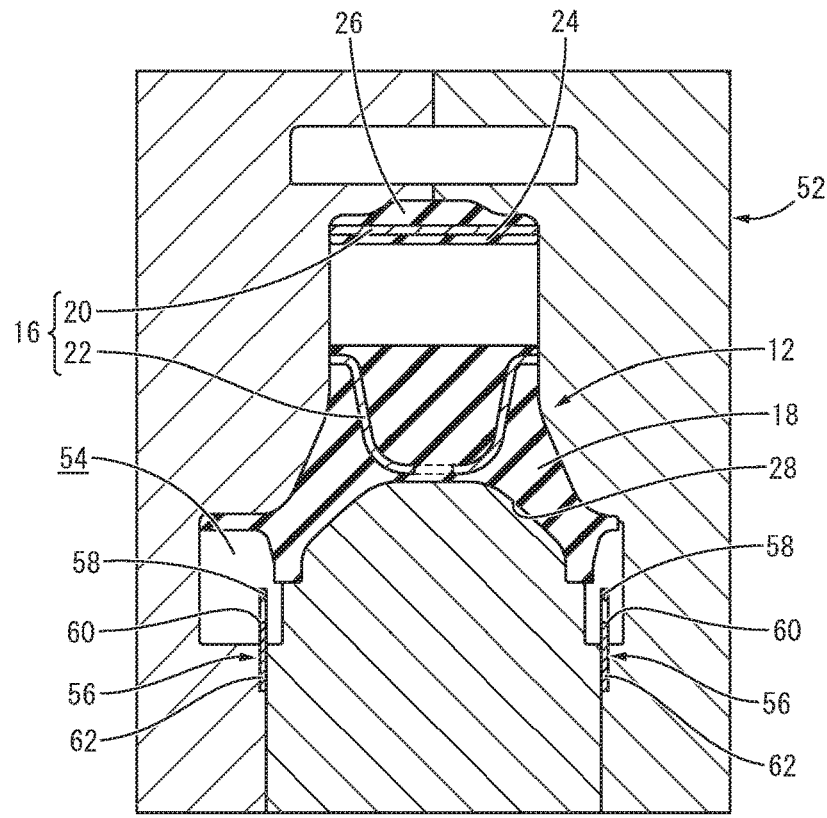
FIG. 13 is a longitudinal cross sectional view suitable for describing a manufacturing process of the outer bracket shown in FIG. 10, wherein the integrally vulcanization molded component and a caulking member are set in a mold for molding.

The outer bracket 14, which is provided integrally with the attachment tubular part 30, the front and back attachment legs 32, 32, and the gate-shaped stopper part 34, is formed by molding using a mold for molding 52 shown in FIG. 13. Specifically, with the integrally vulcanization molded component 12, the nuts 44, and the like set in a cavity 54 of the mold for molding 52 made by combination of a plurality of split molds, the forming material of the outer bracket 14 is injected and filled in the cavity 54, thereby forming the outer bracket 14 as fixed to the main rubber elastic body 18 of the integrally vulcanization molded component 12. Thus, the inner mounting member 16 and the outer bracket 14 are elastically connected with each other by the main rubber elastic body 18.

Figure 14:
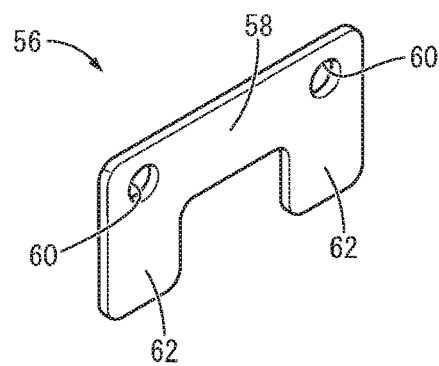
FIG. 14 is a perspective view of the caulking member of the engine mount shown in FIG. 1.

Here, to the outer bracket 14, a pair of left and right caulking members 56, 56 are attached. The caulking member 56 is formed using a different material such as iron from the material of the outer bracket 14, separately from the outer bracket 14, so that the caulking member 56 is a member of excellent plastic workability that can realize caulk fastening described later. In this embodiment, the caulking member 56 is a press fitting made of iron with a thin wall, which facilitates bending working in the thickness direction. As FIG. 14 shows, the upper end of the caulking member 56 is a base part 58. The base part 58 has a nearly rectangular plate shape extending in the front-back direction, and, in this embodiment, detaining holes 60, 60 are formed therein so as to pass through the base part 58 in the thickness direction.

With the base part 58, two projection pieces 62, 62 in a plate shape projecting downward are integrally formed. The two projection pieces 62, 62 are disposed to be spaced away by a prescribed distance in the front-back direction, while projecting downward at the front and back ends of the base part 58. While this embodiment employs the pair of left and right caulking members 56, 56 being independent from each other, it is also possible for example, to form a caulking member having a base part of "U" character shape as viewed in the axial direction that is continuous in the peripheral direction, and two projection pieces 62, 62 formed integrally at each of the left-right opposite portions of the base part such that the caulking member includes two projection pieces 62, 62 at each left-right side, as a single member.

The pair of caulking members 56, 56 are mutually opposed in the left-right direction, and as FIG. 13 shows, they are set in the cavity 54 of the mold for molding 52 during molding of the outer bracket 14, so that they are inserted in the outer bracket 14. Consequently, each base part 58 is fixed to the attachment tubular part 30 of the outer bracket 14 such that it is embedded therein, while each projection piece 62 projects downward from the attachment tubular part 30 of the outer bracket 14, at least in the tip part of the projection piece 62. In other words, the caulking members 56, 56 are fixed to the outer bracket 14, as being partially buried in the outer bracket 14 with each projection piece 62 projecting downward. In the present embodiment, the entirety of each base part 58 is embedded in the attachment tubular part 30 of the outer bracket 14 so that the lower portion of the base part 58 is covered by the outer bracket 14 at a location between the projection pieces 62, 62 provided for each base part 58 in the front-back direction, thereby preventing dislodgement of the caulking members 56 from the outer bracket 14. In this embodiment, during the molding of the outer bracket 14, the forming material is filled in the detaining holes 60 formed at the base part 58, whereby parts of the outer bracket 14 are inserted and engaged in the detaining holes 60, thus preventing the dislodgement of the caulking members 56 from the outer bracket 14.

Using this caulking members 56, a partition member 64 and a flexible film 66 are attached to the integrally vulcanization molded component 12 and the outer bracket 14.

The partition member 64 is a member having a nearly rectangular plate shape with a thick wall and a large diameter, and a structure wherein a plate metal fitting 70 is attached to a partition member main unit 68. The partition member main unit 68 has a thick generally-rectangular plate shape, and, at the central portion thereof, a housing concavity 72 is formed opening in the upper face, while, at the peripheral portion, a peripheral groove 74 is formed extending in the peripheral direction with a shorter length than one periphery and opening in the upper face. Although they are not shown, a plurality of lower through holes are formed through the bottom wall of the housing concavity 72 in the partition member main unit 68, while a lower communication hole is formed at the bottom wall of one end of the peripheral groove 74.

The plate metal fitting 70 has a thin substantially-rectangular plate shape, and it is superposed on the upper face of the partition member main unit 68 to cover the upper openings of the housing concavity 72 and the peripheral groove 74. Although it is not apparent in the drawings, with the plate metal fitting 70, an upper through hole is formed through a part covering the housing concavity 72, while an upper communication hole is formed in a part covering the other end of the peripheral groove 74. The plate metal fitting 70 may be fixed to the partition member main unit 68 by bonding, mechanical engagement, or the like. Alternatively, it is possible that the plate metal fitting 70 is superposed on the partition member main unit 68 as being not fixed thereto and is clamped between the main rubber elastic body 18 and the flexible film 66 described later.

Moreover, in the housing concavity 72 of the partition member main unit 68 covered by the plate metal fitting 70, a movable member 76 is housed. The movable member 76 is a tubular body with about oval cross section, formed of rubber elastic body. As the movable member 76, it is possible to preferably adopt the structures of the movable member disclosed in U.S. Publication No. US 2014/175719, U.S. Publication No. US 2014/232049, U.S. Publication No. US 2014/327199, and Japanese Unexamined Patent Publication No. JP-A-2014-031850, for example.

The partition member 64, in which this movable member 76 is disposed, is inserted in the attachment tubular part 30 of the outer bracket 14, and the outer peripheral end of the upper face thereof is superposed on the main rubber elastic body 18 from the lower side in contact with it. In this embodiment, a gap 77 is formed between the outer peripheral face of the partition member 64 and the inner peripheral face of the attachment tubular part 30 of the outer bracket 14, i.e., the partition member 64 and the attachment tubular part 30 are not in direct contact. The partition member 64 is abutted against a fixing member 78 indirectly, via the flexible film 66 being interposed, whereby the partition member 64 is elastically supported by the main rubber elastic body 18 and the flexible film 66. The partition member 64 may be fixed to the attachment tubular part 30 of the outer bracket 14 and the fixing member 78 in direct contact with it.

Meanwhile, the flexible film 66 is a rubber film in a thin roughly circular disk shape that readily allows deformation in the thickness direction, provided with slack in the up-down direction. The peripheral part of this flexible film 66 is clamped between the partition member 64 and the fixing member 78, so that the flexible film 66 is attached to cover the lower side of the main rubber elastic body 18, thus obstructing the lower opening of the outer bracket 14. The fixing member 78 is a member of high rigidity made of metal like iron in an annular shape, wherein the outer peripheral end is an outer peripheral caulking part 80 that is thick in the up-down direction, while the inner peripheral part is an inner peripheral clamping part 82 that is thinner than the outer peripheral caulking part 80.

The outer peripheral caulking part 80 of the fixing member 78 is fastened through caulking using the projection pieces 62 of the caulking members 56, thereby clamping the outer peripheral end of the flexible film 66 between the inner peripheral clamping part 82 and the partition member 64 in the up-down direction, so that the flexible film 66 is attached to the outer bracket 14. More specifically, when the partition member 64, the flexible film 66, and the fixing member 78 are disposed peripherally inside the outer bracket 14 and the caulking member 56, each projection piece 62 of about flat plate shape extending linearly in the up-down direction is subjected to bending work. That is, the projection pieces 62 are bent into a tapered shape that slants inside in the opposite direction of the pair of caulking members 56, 56 as it goes downward, until the opposite inner faces of all the projection pieces 62 touch the outer peripheral edge of the lower end of the fixing member 78. Consequently, the outer peripheral caulking part 80 of the fixing member 78 is clamped between the attachment tubular part 30 of the outer bracket 14 and all the projection pieces 62 of the caulking members 56 in the up-down direction, and fastened through caulking at four locations on the periphery. In this embodiment, the flexible film 66 and the fixing member 78 constitute the lid member.

The caulking member is admissible as long as it is provided in a state of being fixed to the outer bracket and it can attach the lid member to the outer bracket directly or indirectly by caulking process. Caulking process is one of the processing methods for jointing a plurality of parts, and is to joint them by plastic working of the caulking member. Therefore, it is also possible to use various caulk fastenings by constricting of a cylindrical caulking member, a rivet or eyelet structure wherein a hollow or solid swaging protrusion protruding from the outer bracket is inserted through the lid member and subjected to swaging, and burring clinching, dowel swaging, and the like, in addition to caulk fastening by bending like the embodiment.

By attaching the flexible film 66 in this way, a fluid chamber 84 for which a portion of the wall is constituted by the main rubber elastic body 18 is defined in a fluid-tight manner between the main rubber elastic body 18 and the flexible film 66 in the up-down direction, while a non-compressible fluid or liquid is filled in the fluid chamber 84. Besides, the partition member 64 is disposed in the fluid chamber 84 to partition it in the up-down direction. On the upper side of the partition member 64, a pressure-receiving chamber 86 whose wall is partially constituted by the main rubber elastic body 18 is formed using the large-diameter recess 28, while, on the lower side of the partition member 64, an equilibrium chamber 88 whose wall is partially constituted by the flexible film 66 is formed. In the present embodiment, the flexible film 66 is clamped between the partition member 64 and the fixing member 78 in the up-down direction, so that the inner peripheral side that is out of the caulk-fastened section of the fixing member 78 by the caulking member 56 is provided with a sealing structure, thus keeping the fluidtightness of the fluid chamber 84. The non-compressible fluid sealed in the fluid chamber 84 including the pressure-receiving chamber 86 and the equilibrium chamber 88 is not particularly limited. Desirable ones are liquids such as water, ethylene glycol, alkylene glycol, polyalkylene glycol, silicone oil, and mixtures of some of them, for example, and more preferably, a low-viscosity fluid having viscosity of 0.1 Pa·s or lower is adopted.

A tunnel-shaped passage is formed by covering the upper opening of the peripheral groove 74 with the plate metal fitting 70. One end of the tunnel-shaped passage communicates with the pressure-receiving chamber 86 via the not-shown upper communication hole, while the other end of the peripheral groove 74 communicates with the equilibrium chamber 88 via the not-shown lower communication hole. Thus, the peripheral groove 74 forms an orifice passage 90 communicating the pressure-receiving chamber 86 and the equilibrium chamber 88 with each other. By vibration input between the inner mounting member 16 and the outer bracket 14 in the up-down direction, the internal pressure of the pressure-receiving chamber 86 fluctuates relative to the internal pressure of the equilibrium chamber 88, thereby making the fluid flow between the pressure-receiving chamber 86 and the equilibrium chamber 88 through the orifice passage 90. This exhibits vibration-damping effect based on the flow behavior like the fluid resonance action. With respect to the orifice passage 90, the ratio (A/L) of the passage cross sectional area (A) to the passage length (L) is adjusted considering the wall spring rigidity of the fluid chamber 84, whereby the tuning frequency, which is the resonance frequency of the flowing fluid, is set as appropriate. For example, the tuning frequency is tuned to a low frequency vibration of about 10 Hz corresponding to engine shake.

On the upper face of the movable member 76, the pressure of the pressure-receiving chamber 86 is exerted via the upper through hole, while, on the lower face of the movable member 76, the pressure of the equilibrium chamber 88 is exerted via the lower through holes. Therefore, the relative pressure fluctuation between the pressure-receiving chamber 86 and the equilibrium chamber 88 displaces the movable member 76 in the housing concavity 72 in the up-down direction, thereby achieving the low spring based on the liquid pressure-absorbing action. Especially, the liquid pressure-absorbing action by the movable member 76 is effectively exhibited relative to input of a small-amplitude vibration of higher frequency than the tuning frequency of the orifice passage 90. Thus, when the orifice passage 90 is substantially obstructed by antiresonance, markedly high dynamic spring behavior is prevented, so that the target vibration isolation effect is exerted. Meanwhile, relative to input of engine shake, which is a low-frequency, large-amplitude vibration, the displacement of the movable member 76 is regulated by the contact with the partition member, whereby the internal pressure fluctuation of the pressure-receiving chamber 86 is effectively induced, thus efficiently making the fluid flow via the orifice passage 90 tuned to the low frequency.

About the engine mount 10 according to this embodiment, a not-shown inner bracket that should be fitted in the fitting part 20 of the inner mounting member 16 via a rubber is configured to be attached to a power unit, which is not shown, either. On the other hand, the attachment legs 32, 32 of the outer bracket 14 are configured to be attached to a not-shown vehicle body by not-shown bolts that should be threaded in the nuts 44, 44.

With the engine mount 10 of this embodiment mounted on the vehicle in this way, an up-down stopper and a front-back stopper are constituted. Specifically, the fitting part 20 of the inner mounting member 16 and the gate-shaped stopper part 34 of the outer bracket 14 are abutted on each other via the stopper rubber 26, thus constituting stoppers limiting the relative displacement amount of the inner mounting member 16 relative to the outer bracket 14 to the front-back sides and the upper side (the front-back stopper and the rebound stopper). Additionally, the inner bracket fixed to the inner mounting member 16 is abutted against the stopper receiving part 40 of the attachment tubular part 30 of the outer bracket 14 via a part of the main rubber elastic body 18, thus constituting a stopper that limits the relative displacement amount of the inner mounting member 16 relative to the outer bracket 14 to the lower side (the bound stopper).

According to the engine mount 10 of this structure following the present embodiment, the outer peripheral face of the main rubber elastic body 18 is directly fixed to the outer bracket 14. This configuration eliminates the outer mounting member, and may provide the simplified and/or lightened structure of the engine mount, compared with the structure wherein the outer bracket 14 is attached to the main rubber elastic body 18 indirectly via the outer mounting member.

Also, the caulking member 56 for attaching the flexible film 66 and the partition member 64 is an independent part whose material is different from that of the outer bracket 14, and the caulking member 56 is fixed to the outer bracket 14 during the molding of the outer bracket 14. This makes it possible to further lighten the outer bracket 14 by forming it using a light-weight material such as a synthetic resin and an aluminum alloy, while realizing simple attachment of the flexible film 66 and the partition member 64 using the caulking member 56. Particularly, it is possible to advantageously form by molding the outer bracket 14, which requires high rigidity, while having the outer bracket 14 project the projection piece 62, which has a thin wall and excellent bending workability and is difficult to mold. In this way, it is possible to realize at a high level both the characteristics such as high rigidity and weight reduction required for the outer bracket 14, and the characteristics such as workability and sufficient strength with thin wall, which are required for caulk fastening with the caulking member 56.

The base part 58 of the caulking member 56 is fixed to the outer bracket 14 as being embedded in the outer bracket 14, whereby the caulking member 56 can be firmly attached to the outer bracket 14. Especially in the present embodiment, the caulking member 56 is fixed to the outer bracket 14 with the parts of the outer bracket 14 inserted through the detaining holes 60, 60 of the base part 58, thus more favorably preventing the dislodgement of the caulking member 56 from the outer bracket 14. In addition, since the caulking member 56 is fixed to the outer bracket 14 as partially buried therein when molding the outer bracket 14, by attaching the caulking member 56 to the mold for molding 52 when molding the outer bracket 14, the need for a special attachment step for the caulking member 56 is eliminated.

Furthermore, the caulking member 56 is fixed to the rigid outer bracket 14, thereby enabling precise positioning of the caulking member 56 in relation to the outer bracket 14. As a result, via the caulking member 56, it is possible to stably attach the flexible film 66 and the partition member 64, which should be attached to the outer bracket 14, at suitable locations of the outer bracket 14.

In the present embodiment, the pair of left and right caulking members 56, 56 are provided to be mutually separate. Therefore, compared with a caulking member that is continuous across the entire periphery, deformation and damage of the caulking members 56 resulting from heat shrinkage and the like during the molding of the outer bracket 14 are less likely to occur.

The embodiment of the present invention has been described above, but this invention is not limited by the specific description of the embodiment. For example, the aforesaid embodiment uses the main rubber elastic body 18 having about rectangular shape with round corners as viewed in the axial direction, but it is also possible to adopt the main rubber elastic body 18 of different shape such as substantially circle or oval as viewed in the axial direction. In this case, it is possible to use a different shape like circle or oval as axially viewed corresponding to the main rubber elastic body 18, also for the bonded part 22 of the inner mounting member 16, the partition member 64, the flexible film 66, the fixing member 78, the attachment tubular part 30 of the outer bracket 14, and the like.

Besides, for example, it is possible as well to use a structure wherein a tubular fixing member bonded by vulcanization to the outer peripheral edge of the flexible film is fastened through caulking using the projection piece 62 of the caulking member 56. For this structure, by provision of a seal rubber layer between the projection piece 62 of the caulking member 56 and the fixing member or the like, for example, a seal structure is provided at the caulking sections, thereby keeping the fluidtightness of the fluid chamber 84.

For forming the outer bracket 14, a light metal like a synthetic resin or an aluminum alloy is preferably used, but the forming material thereof is not especially limited, as long as it meets the performance required for the outer bracket 14. More preferably, the outer bracket 14 is formed of material with lower specific gravity than that of the caulking member 56.

Moreover, it is also possible to prepare in advance the outer bracket 14 to which the caulking member 56 is attached, and set the outer bracket 14 in the mold for molding of the main rubber elastic body 18, and bond the outer bracket 14 to the main rubber elastic body 18 by vulcanization, through the vulcanization molding of main rubber elastic body 18.

The specific structure of the caulking member 56 including the shape for the base part 58 and the projection piece 62, the number and the arrangement of the projection piece 62, and the like is not particularly limited and can be changed as appropriate. Specifically, for example, it is possible to adopt any structures for the caulking member 56, including a structure wherein the base part has "U" character shape or annular shape continuous in the peripheral direction, a structure wherein the plurality of projection pieces 62 are mutually independent without being connected by the base part, and a structure wherein the projection pieces 62 are provided at the front and back sides.

The caulking member is not always required to be attached to the outer bracket as the caulking member is fixed thereto with a part of the caulking member buried therein. For example, the caulking member may be fixed to the outer bracket by being engaged in the outer bracket. Specifically, for example, the base part of the caulking member is provided with an engagement claw that projects to the outer peripheral side, while, the inner peripheral face of the attachment tubular part of the outer bracket is provided with an engagement concave part of groove or concavity shape corresponding to the engagement claw. The caulking member is inserted in the attachment tubular part of the outer bracket while the engagement claw is fitted in the engagement concave part, whereby the caulking member may be attached to the outer bracket through engagement of the engagement claw and the engagement concave part. When using the structure of attachment of the caulking member to the outer bracket by this engagement, it is also possible to avoid release of the engagement between the engagement claw and the engagement concave part through limitation on deformation amount of the base part to the inner periphery, for example by adopting a tubular base part that is continuous in the peripheral direction, or by disposing the partition member peripherally inside the base part of the caulking member.

The above-described embodiment is an example of application of the fluid-filled vibration damping device according to the present invention to the automotive engine mount. However, it is possible to apply this invention not only to the automotive engine mount, but also to those of a motorcycle, a railway vehicle, an industrial vehicle, and the like, for example. Furthermore, the fluid-filled vibration damping device according to this invention is not used only for the engine mount and can be used as well for a differential mount, a body mount, and the like as long as they are vibration damping devices interposed between the components of the vibration transmission system that should be connected in a vibration-damping manner.

What is claimed is:

1. A fluid-filled vibration damping device comprising:
an inner mounting member;
an outer bracket formed by molding;
a main rubber elastic body elastically connecting the inner mounting member and the outer bracket with each other;
a fluid chamber for which a portion of a wall is constituted by the main rubber elastic body with a non-compressible fluid sealed therein;
a plurality of caulking members that are independent and spaced away from each other, each caulking member being comprised of a material that is different from a material of the outer bracket, each caulking member including a plurality of projection pieces that are projecting while being spaced away from each other, and each caulking member being fixed to the outer bracket with the projecting pieces projecting out from the outer bracket; and
a lid member constituting an other portion of the wall of the fluid chamber, the lid member being attached to the outer bracket by being fastened through caulking with bending of the projecting pieces of each caulking member.

2. The fluid-filled vibration damping device according to claim 1, wherein the outer bracket is made of synthetic resin.

3. The fluid-filled vibration damping device according to claim 1, wherein each caulking member is fixed to the outer bracket as being partially buried in the outer bracket.

4. The fluid-filled vibration damping device according to claim 1, wherein each caulking member is fixed to the outer bracket by being engaged in the outer bracket.

5. The fluid-filled vibration damping device according to claim 1, wherein the lid member includes a flexible film, while a partition member is disposed in the fluid chamber to partition the fluid chamber into a pressure-receiving chamber whose wall is partially constituted by the main rubber elastic body and an equilibrium chamber whose wall is partially constituted by the flexible film on opposite sides of the partition member, and an orifice passage is formed communicating the pressure-receiving chamber and the equilibrium chamber with each other.

6. The fluid-filled vibration damping device according to claim 5, wherein the lid member includes the flexible film and an annular fixing member, and a peripheral part of the flexible film is clamped between the partition member and the fixing member.

* * * * *